J. Meyer, Jr.,

Knife Sharpener.

No. 2,762. Reissued Sept. 10, 1867.

Witnesses.
J. A. Service
Theo. Tusche

Inventor.
Jas. Meyer Jr.
Per Munn & Co
Attorneys.

United States Patent Office.

JAMES MEYER, JR., OF NEW YORK, N. Y.

*Letters Patent No.* 64,687, *dated May* 14, 1867; *reissue No.* 2,762, *dated September* 10, 1867.

IMPROVED KNIFE-SHARPENER.

BEST AVAILABLE COPY

BEST AVAILABLE COPY

The Schedule referred to in these Letters Patent and making part of the same.

TO ALL WHOM IT MAY CONCERN:

Be it known that I, JAMES MEYER, Jr., of the city, county, and State of New York, have invented a new and improved Device for Sharpening Cutlery, and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and improved device for sharpening cutlery of all kinds, and has for its object portability, efficiency, and economy in construction.

The invention is an improvement on that class of sharpeners in which two hard-steel cutting-plates are connected by a pivot, and between which the blade to be sharpened is drawn. In the accompanying sheet of drawings—

Figure 1:
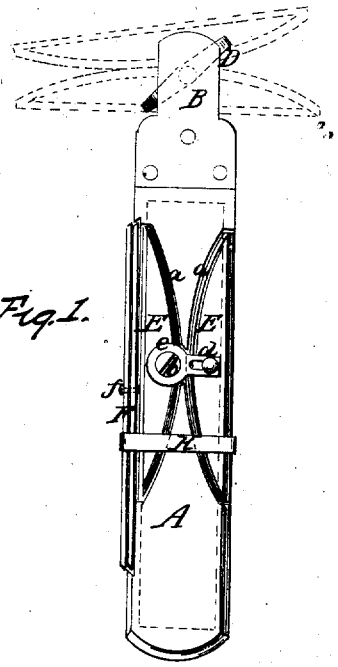

Figure 1 is a side view of my invention.

Figure 2:
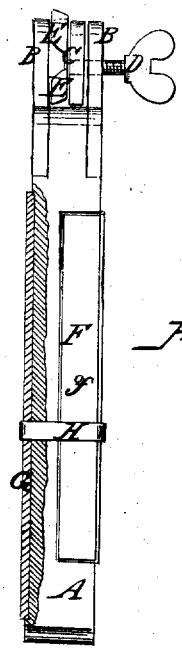

Figure 2, an edge view of the same, partly in section.

Figure 3:
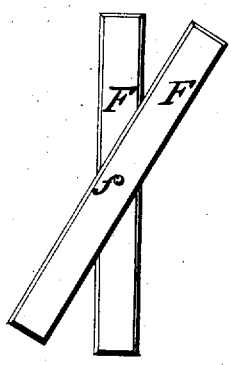

Figure 3, a detached view of one pair of cutting-plates pertaining to the same.

Similar letters of reference indicate like parts.

A represents the handle of the device, which may be constructed of wood or other suitable material, and of quadrilateral form. To one end of the handle, at opposite sides thereof, there are permanently secured two metallic plates B B, between which there is fitted a loose or sliding metallic plate, C, which is adjusted by a thumb-screw, D, as will be fully understood by referring to fig. 2. E E′ represent two hard-steel plates, which constitute a pair of cutters, the cutting edges *a a* of which are rounded longitudinally and bevelled transversely. To one of these plates, E, there is secured, by a screw, *b*, a metal plate, *c*, having a slotted arm, *d*, projecting from it, through which and the other plate E′ a rivet, *e*, passes. By this means the two plates E E′ are connected, so as to admit of their cutting edges being adjusted in contact at different points, which is necessary in order to obtain a new cutting surface when one part is damaged or rendered inefficient by wear. A rigid or fixed pivot or joint would not answer the purpose in consequence of the cutting edges of the plates being rounded longitudinally and being in the same plane. These cutters, when required for use, are clamped in the end of the handle A, between one of the metallic plates B and the sliding plate C, and are held firmly by the screw D, and the knife or blade sharpened by being drawn between the plates. When not required for use, the plates are inserted in recesses made in one side of the handle A. F F represent two hard-steel plates, which have straight cutting edges, and are connected by a pivot, *f*, which passes through the plates at the centre of their width. By this arrangement the plates lap over each other, and are not in the same plane, and the cutting angle varies at each adjustment of the plate F, the cutting angle being less or more acute as the plates are adjusted towards each other. This is not the case with the plates E E′, as, the cutting edges being rounded longitudinally, the cutting angle will be nearly the same at all points of adjustment. The plates F, like the plates E, are clamped at one end of the handle A, when required for use, and when not in use are inserted in a groove or recess in the handle A. One of the plates F may be a little wider than the other, or the pivot *f* may pass through one plate a little at one side of the centre of its width, so that its cutting edge may project beyond the other plate and form a scraper. The two pairs of cutters are a great acquisition in a cutlery-sharpening device, as in some cases one pair may be more preferable than the other. A thick blade, for instance, when operated upon, requires the cutting angle of the plates to be less than when a thin blade is operated upon. At one side of the handle A a strap, G, is attached for putting a smooth edge on the sharpened blade. The cutters may be held in their recesses in the handle by an elastic band, H.

Having thus described my invention, I claim as new, and desire to secure by Letters Patent—

1. The cutting plates E E′, provided with longitudinal rounded edges, and connected together by a sliding joint, substantially in the manner as and for the purpose set forth.

2. The combination of the handle A with the two pairs of cutters E E′ F F, the clamp at one end of the handle, and the recesses in the same to receive the cutters with or without the strap G, substantially as and for the purpose specified.

3. The cutters E E′, when placed in the same plane and connected together by means of the sliding joint, or its equivalent, substantially as described for the purpose specified.

The above specification of my invention signed by me this 29th day of June, 1867.

JAMES MEYER, JR.

Witnesses:

WM. F. MCNAMARA,

ALBY. F. ROBERTS